United States Patent
Nobumoto et al.

(10) Patent No.: US 9,834,110 B2
(45) Date of Patent: Dec. 5, 2017

(54) MOVEMENT CONTROL DEVICE FOR VEHICLE

(71) Applicant: MAZDA MOTOR CORPORATION, Hiroshima (JP)

(72) Inventors: Hidetoshi Nobumoto, Higashihiroshima (JP); Osamu Sunahara, Hiroshima (JP); Shinichiro Yamashita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 305 days.

(21) Appl. No.: 14/522,828

(22) Filed: Oct. 24, 2014

(65) Prior Publication Data

US 2015/0120121 A1    Apr. 30, 2015

(30) Foreign Application Priority Data

Oct. 31, 2013    (JP) .................................. 2013-226329

(51) Int. Cl.
*B60L 11/18*    (2006.01)
*B60W 40/114*    (2012.01)
(Continued)

(52) U.S. Cl.
CPC ............. *B60L 11/1861* (2013.01); *B60L 7/14* (2013.01); *B60L 11/18* (2013.01); *B60L 11/1872* (2013.01); *B60L 15/2009* (2013.01); *B60W 10/184* (2013.01); *B60W 10/26* (2013.01); *B60W 30/045* (2013.01); *B60W 30/18127* (2013.01); *B60W 40/114* (2013.01); *B60L 2240/22* (2013.01); *B60L 2240/24* (2013.01); *B60L 2240/423* (2013.01);
(Continued)

(58) Field of Classification Search
CPC ........ B60L 11/18; B60L 7/14; B60L 15/2009; B60L 11/1872; B60W 40/114; B60W 10/184; B60W 10/26; B60W 30/045; B60W 30/18127; B60W 2710/083; Y02T 10/72; Y02T 10/7005
See application file for complete search history.

(56) References Cited

U.S. PATENT DOCUMENTS 6,010,198 A * 1/2000 Nakazawa ............... B60T 8/404
                                                        303/10
6,070,953 A * 6/2000 Miyago ..................... B60L 7/10
                                                        188/156

(Continued)

FOREIGN PATENT DOCUMENTS

JP    2010-162911 A    7/2010
JP    2012-209489 A    10/2012

*Primary Examiner* — Mussa A Shaawat
(74) *Attorney, Agent, or Firm* — Studebaker & Brackett PC

(57) ABSTRACT

A movement control device for a vehicle comprises a yaw-acceleration calculation portion to calculate a target yaw acceleration of the vehicle, a turn-back steering determination portion to determine whether a turn-back steering of the vehicle is conducted or not, and a drive-force control portion to a drive force of the vehicle. The control of the drive-force control portion is configured such that when the turn-back steering is not conducted, the amount of drive-force decreasing is increased with a specified increasing rate as the target yaw acceleration increases, the specified increasing rate becoming smaller as the target yaw acceleration increases, and when the turn-back steering is conducted, the drive force is increased in a case in which an absolute value of a steering angle of the vehicle decreases.

8 Claims, 7 Drawing Sheets

(51) Int. Cl.
  *B60L 7/14*      (2006.01)
  *B60L 15/20*     (2006.01)
  *B60W 10/184*    (2012.01)
  *B60W 10/26*     (2006.01)
  *B60W 30/045*    (2012.01)
  *B60W 30/18*     (2012.01)

(52) U.S. Cl.
  CPC ... *B60L 2240/545* (2013.01); *B60L 2240/547* (2013.01); *B60L 2240/549* (2013.01); *B60L 2250/16* (2013.01); *B60W 2510/244* (2013.01); *B60W 2520/14* (2013.01); *B60W 2540/18* (2013.01); *B60W 2710/083* (2013.01); *Y02T 10/645* (2013.01); *Y02T 10/705* (2013.01); *Y02T 10/7005* (2013.01); *Y02T 10/7044* (2013.01); *Y02T 10/72* (2013.01); *Y02T 10/7275* (2013.01)

(56) References Cited

U.S. PATENT DOCUMENTS

| | | | |
|---|---|---|---|
| 6,164,731 A * | 12/2000 | Nakazawa | B60T 8/4031 303/10 |
| 6,591,179 B1 * | 7/2003 | Check | B60K 23/0808 180/248 |
| 7,668,635 B2 * | 2/2010 | Raksincharoensak | B62D 6/003 180/204 |
| 8,874,322 B2 * | 10/2014 | Mori | B62D 15/025 180/204 |
| 9,090,258 B2 * | 7/2015 | Takahashi | B60W 30/143 |
| 2004/0267427 A1 * | 12/2004 | Suzuki | B60T 8/1755 701/69 |
| 2012/0059547 A1 * | 3/2012 | Chen | B60W 10/04 701/37 |
| 2012/0139330 A1 * | 6/2012 | Morishita | B60T 1/10 303/3 |
| 2012/0209489 A1 * | 8/2012 | Saito | B60T 7/042 701/70 |
| 2013/0144476 A1 * | 6/2013 | Pinto | B60T 8/17555 701/22 |
| 2013/0179015 A1 * | 7/2013 | Liang | B60W 10/08 701/22 |
| 2013/0234500 A1 * | 9/2013 | Morishita | B60T 1/10 303/3 |
| 2016/0084661 A1 * | 3/2016 | Gautama | G01C 21/365 701/400 |

* cited by examiner

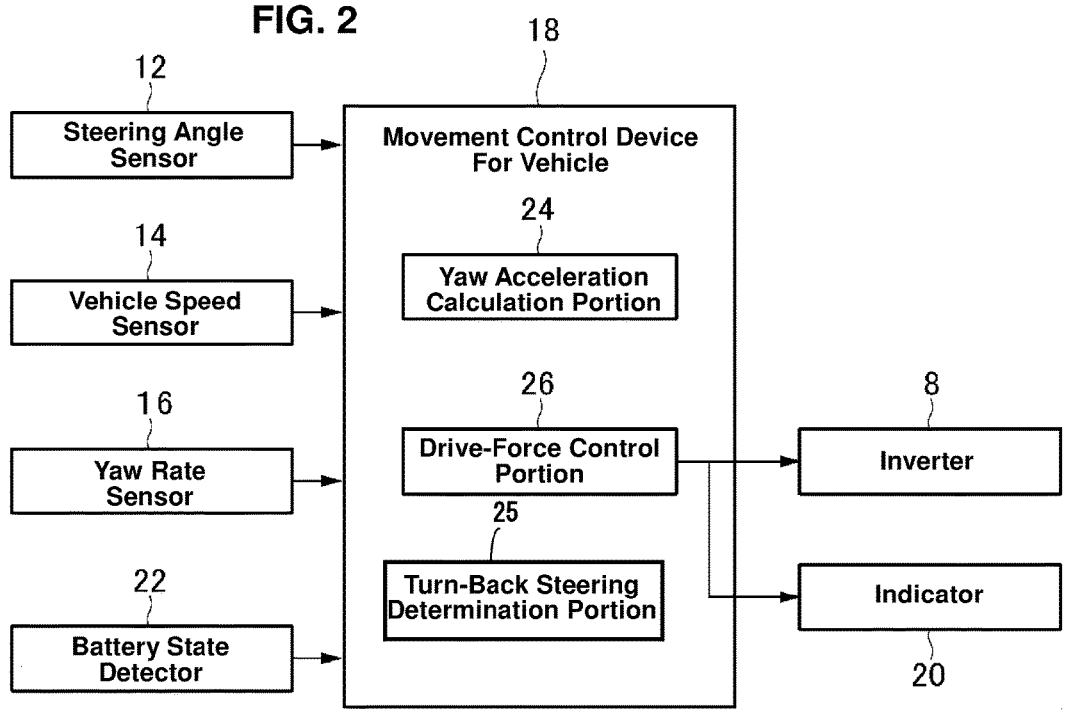
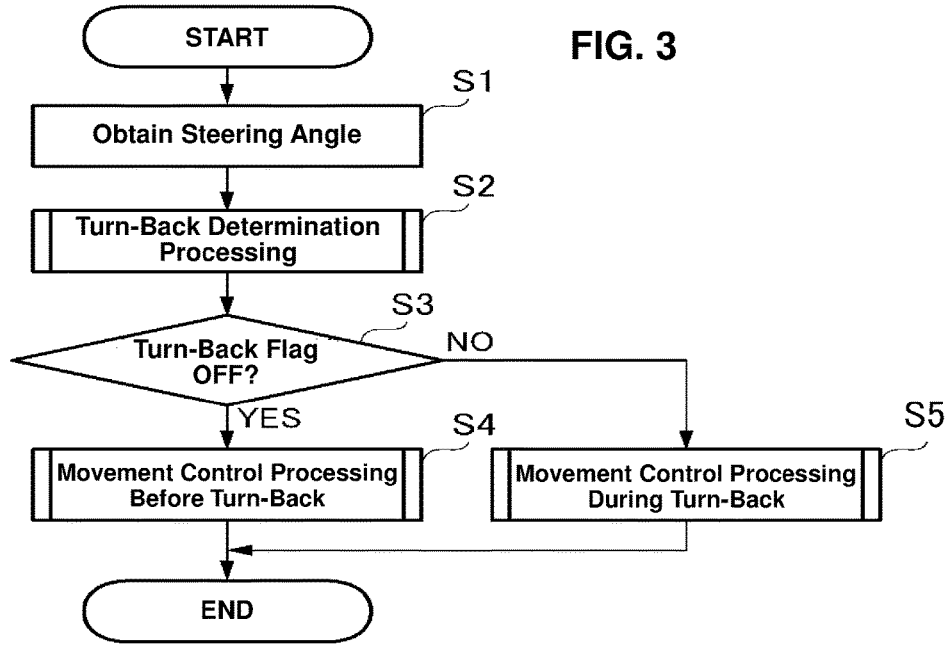

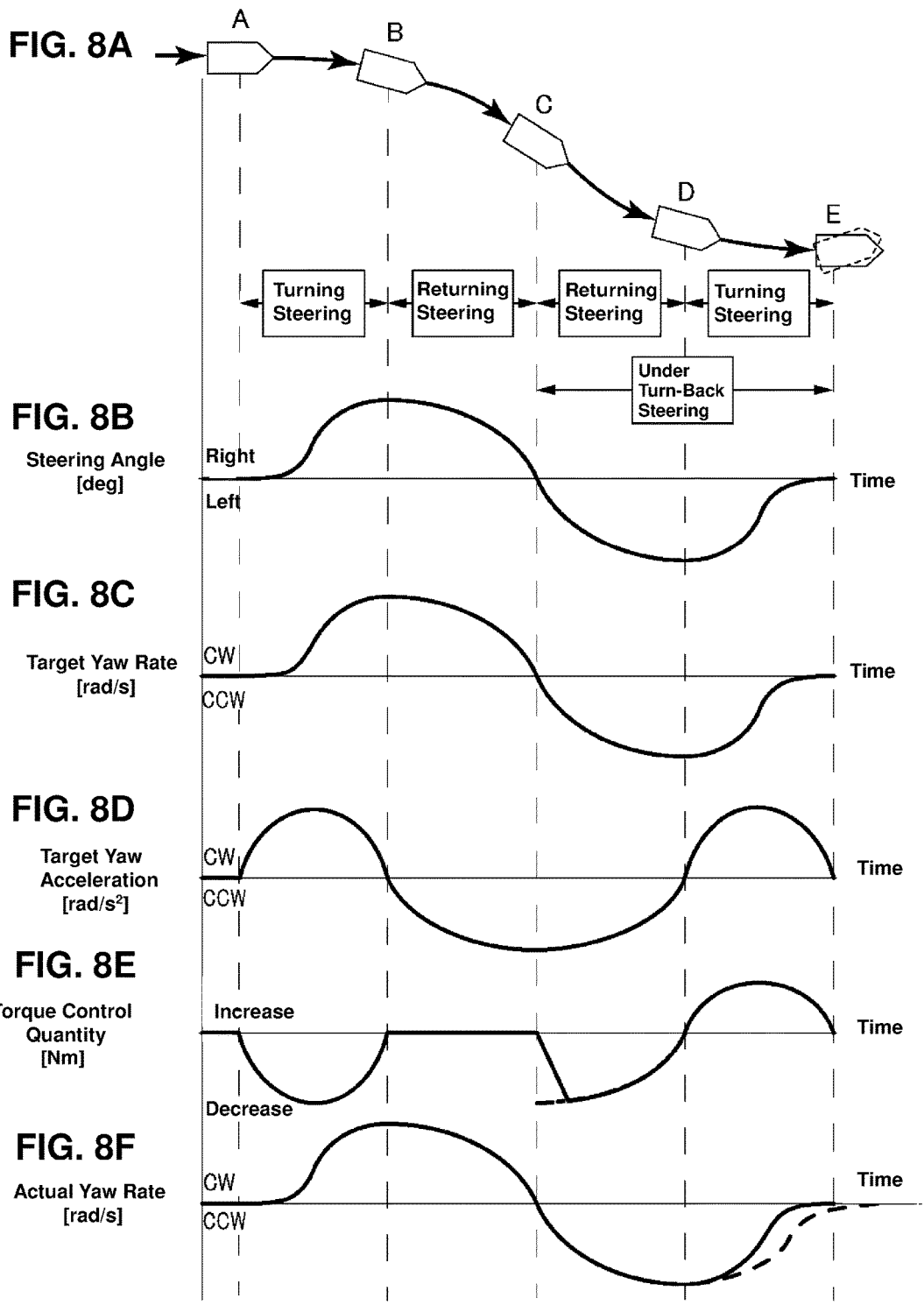

MOVEMENT CONTROL DEVICE FOR VEHICLE

BACKGROUND OF THE INVENTION

The present invention relates to a movement control device for a vehicle, and in particular, relates to the movement control device for a vehicle which controls a movement of the vehicle equipped with front wheels steered.

Conventionally, a control device capable of controlling a movement of a vehicle so as to become stable when the vehicle's movement is unstable because of a slip or the like (such as an anti-sideslip apparatus) is known. Specifically, a control device, in which when it is detected that under-steering or over-steering movements happen to the vehicle during vehicle's cornering or the like, the speed of wheels are decelerated properly to restraint such movements, is known.

Meanwhile, another type of control device to adjust a load acting on the front wheels as the steered wheels (see US Patent Application Publication No. 2012/0209489 A1, for example) is known. This control device is different from the above-described control to improve the stable traveling of the vehicle when the vehicle movement is unstable, and adjusts deceleration during the cornering for adjusting the load acting on the front wheels so as to stabilize a series of driver's operations (braking, turning of steering, accelerating, returning of steering etc.) during the cornering of the vehicle traveling in a normal traveling state.

In the vehicle movement control device of the above-described patent document, for example, the traveling state of the vehicle during the cornering is detected and the deceleration control of the vehicle is performed by controlling an oil-pressure brake system based on its detection results. This oil-pressure brake system is generally configured to have some play among parts, so that there is a time lag between the input timing of control values to the oil-pressure brake system and the occurrence timing of the vehicle deceleration. Accordingly, it may be difficult for a conventional device to perform the deceleration control of the vehicle at an appropriate timing. Herein, the vehicle movement control device of the above-described patent document predicts a corner (curve) located in front of the traveling vehicle by using a camera and starts the control of the oil-pressure brake system before reaching the corner in order to solve the above-described difficulty, but this method may cause improper complexity of the device or costs increase.

The inventors of the present invention found through the investigations that the control for stabilizing the driver's operations during the cornering was possible by controlling a drive force of the vehicle, without using the brake system. Further, the inventors found that, it was possible in an electric-drive vehicle to adjust the deceleration by adjusting regenerative electric power, in particular, for the above-described stabilizing control, and this adjustment of the regenerative electric power enabled the direct drive-force adjustment through motor-torque decreasing (i.e., motor regeneration) properly, without generating the improper time lag caused by using the oil-pressure brake system.

Further, the inventors of the present invention found that it was effective to control the drive force of the vehicle based on a yaw-rate relating quantity relating to a yaw rate of the vehicle such that the drive force is decreased as the yaw-rate relating quantity increases, the rate of decreasing of the drive force being configured to become smaller according to an increase of the yaw-rate relating quantity. This is, the above-described control can cause a situation in which the vehicle has the deceleration quickly at the start timing of steering of the vehicle, thereby making the sufficient load quickly act on the front wheels as the steered wheels. Consequently, the friction between the front wheels as the steered wheels and a road surface increases and thereby the cornering force increases, so that the turning performance of the vehicle at an initial timing of the vehicle's cornering can be improved and thereby the responsiveness to the turning operation of the steering can be improved.

However, in a case in which the drive force of the vehicle is decreased when turn-back steering is conducted (when a driver operates a steering wheel to the right and the left repeatedly for a lane change, for example), the turning performance of the vehicle improves and thereby the yaw rate of the vehicle increases. Accordingly, in order to finish the turn-back steering, it may be necessary to return the steering wheel to its central position with a quick operation according to the increased yaw rate. However, if the driver's steering operation fails to follow the speed of the vehicle's yaw rate increasing, there is a concern that the yaw rate of the vehicle may not converge to zero (0) even at the timing when the vehicle turns ahead, so that the vehicle may continue its turning improperly.

SUMMARY OF THE INVENTION

The present invention has been devised in view of the above-described matters, and an object of the present invention is to provide a movement control device for a vehicle which can prevent a delay of the yaw rate's convergence even when the turn-back steering is conducted, thereby controlling the vehicle's movement properly so that the driver's operation during the vehicle's cornering can be natural and stable.

According to the present invention, there is provided a movement control device for a vehicle which controls a movement of the vehicle equipped with front wheels steered, the movement control device being configured to perform the process of obtaining a yaw-rate relating quantity which relates to a yaw rate of the vehicle, determining whether a turn-back steering of the vehicle is conducted or not, and controlling a drive force of the vehicle such that the drive force is decreased according to the yaw-rate relating quantity, wherein the above-described controlling of the drive force of the vehicle is configured such that when the turn-back steering is not conducted, the amount of the above-described drive-force decreasing is increased with a specified increasing rate as the yaw-rate relating quantity increases, the specified increasing rate being configured to become smaller as the yaw-rate relating quantity increases, and when the turn-back steering is conducted, and when the turn-back steering is conducted, the drive force is increased in a case in which an absolute value of a steering angle of the vehicle decreases.

According to the present invention, since the amount of drive-force decreasing is increased quickly as the yaw-rate relating quantity increases after starting of the vehicle's steering in a state in which the turn-back steering is not conducted (in an initial stage of the lane change before the turn-back steering, for example), the vehicle can have the deceleration quickly at the start timing of the steering of the vehicle, so that the sufficient load can be made to quickly act on the front wheels as the steered wheels. Consequently, the friction between the front wheels as the steered wheels and the road surface increases and thereby the cornering force increases, so that the turning performance of the vehicle at the initial timing of the vehicle's cornering can be improved and thereby the responsiveness to the turning operation of the steering can be improved. Further, since it is configured such that the increasing rate of the amount of the above-described drive-force decreasing becomes smaller according to the increase of the yaw-rate relating quantity, it can be prevented that the deceleration of the vehicle during the vehicle's cornering becomes excessive (too large), so that the deceleration can be decreased quickly when the steering is finished. Accordingly, the driver can be prevented from having improper dragging feelings of decreasing of the drive force when the vehicle gets out of the cornering. Additionally, since the drive force is increased in a state in which the turn-back steering is conducted and the absolute value of the steering angle of the vehicle decreases (when the driver returns the steering wheel to its central position in a late stage of lane changing, for example), the vehicle can have acceleration at the steering for returning to the vehicle's turning ahead, so that the load acting on rear wheels can be increased. Consequently, the cornering force of the rear wheels increases, so that the straight advancing ability of the vehicle can be improved and thereby the yaw rate can be surely made to converge. Thus, the movement control device for a vehicle according to the present invention can prevent the delay of the yaw rate's convergence even when the turn-back steering is conducted, thereby controlling the vehicle's movement properly so that the driver's operation during the vehicle's cornering can be natural and stable.

According to an embodiment of the present invention, the above-described decreasing control of the drive force of the vehicle is performed in a case in which the absolute value of the steering angle of the vehicle increases. Thereby, since the drive force of the vehicle is decreased in the case in which the absolute value of the steering angle of the vehicle increases because of the turning operation of the steering, the sufficient load can be made to quickly act on the front wheels as the steered wheels when the turning operation of the steering is conducted, so that the responsiveness of the vehicle to the turning operation of the steering can be improved surely.

According to another embodiment of the present invention, the vehicle is an electric-drive vehicle equipped with a motor to drive wheels and a battery to supply electric power to the motor and store regenerative electric power generated by the motor, and the decreasing control of the drive force of the vehicle is performed by controlling the amount of the regenerative electric power generated by the motor. Thereby, the drive force of the vehicle can be decreased directly by decreasing a torque of the motor. Accordingly, compared with a case in which the drive force of the vehicle is decreased by controlling an oil-pressure brake unit, the responsiveness of the drive-force decreasing can be improved, so that the movement of the vehicle can be controlled more directly.

According to another embodiment of the present invention, the vehicle is further equipped with a battery-state detector to detect a state of the battery and an indicator to indicate information relating to the drive force's control, and the controlling of the drive force of the vehicle further includes a control of not decreasing the drive force of the vehicle and making the indicator indicate the information that the drive force of the vehicle is not decreased when it is determined based on the battery state detected by the battery-state detector that the battery is incapable of storing the regenerative electric power generated by the motor. Thereby, since the torque of the motor is not decreased so that the regenerative electric power is not generated in a case in which the battery is overcharged because of the storing of the regenerative electric power generated by the motor or a case in which the battery temperature exceeds an allowable temperature range, the battery can be prevented from having any damage caused by the overcharging or the deviation from the allowable temperature range. Further, since the indicator indicates the information that the drive force of the vehicle is not decreased, the driver can be prevented from having uncomfortable feelings because the drive force is not decreased when the vehicle gets into the cornering.

Other features, aspects, and advantages of the present invention will become apparent from the following description which refers to the accompanying drawings.

BRIEF DESCRIPTION OF THE DRAWINGS

FIG. 2 is a block diagram showing electric constitution of the movement control device for a vehicle according to the embodiment of the present invention.

FIG. 3 is a flowchart of movement control processing to control the movement of the vehicle by the movement control device for a vehicle according to the embodiment of the present invention.

FIGS. 8A-8F are diagram showing time changes of parameters relating to the movement control by the movement control device for a vehicle when the vehicle installing the movement control device for a vehicle according to the embodiment of the present invention conducts a lane change to a right-side lane: FIG. 8A being a plan view schematically showing the vehicle's conducting the lane change; FIG. 8B being the diagram showing a change of a steering angle of the vehicle's conducting the lane change as shown in FIG. 8A; FIG. 8C being the diagram showing a change of a target yaw rate which is calculated based on the steering angle of the vehicle shown in FIG. 8B; FIG. 8D being the diagram showing a change of the target yaw acceleration which is calculated based on the target yaw rate shown in FIG. 8C; FIG. 8E being the diagram showing a change of a torque-control quantity of a motor which is decided by the drive-force control portion based on the target yaw acceleration shown in FIG. 8D; and FIG. 8F being the diagram showing a change of a yaw rate which occurs at the vehicle's conducting its steering as shown in FIG. 8B when a torque control of the motor is performed as shown in FIG. 8E.

DETAILED DESCRIPTION OF THE INVENTION

Figure 1:
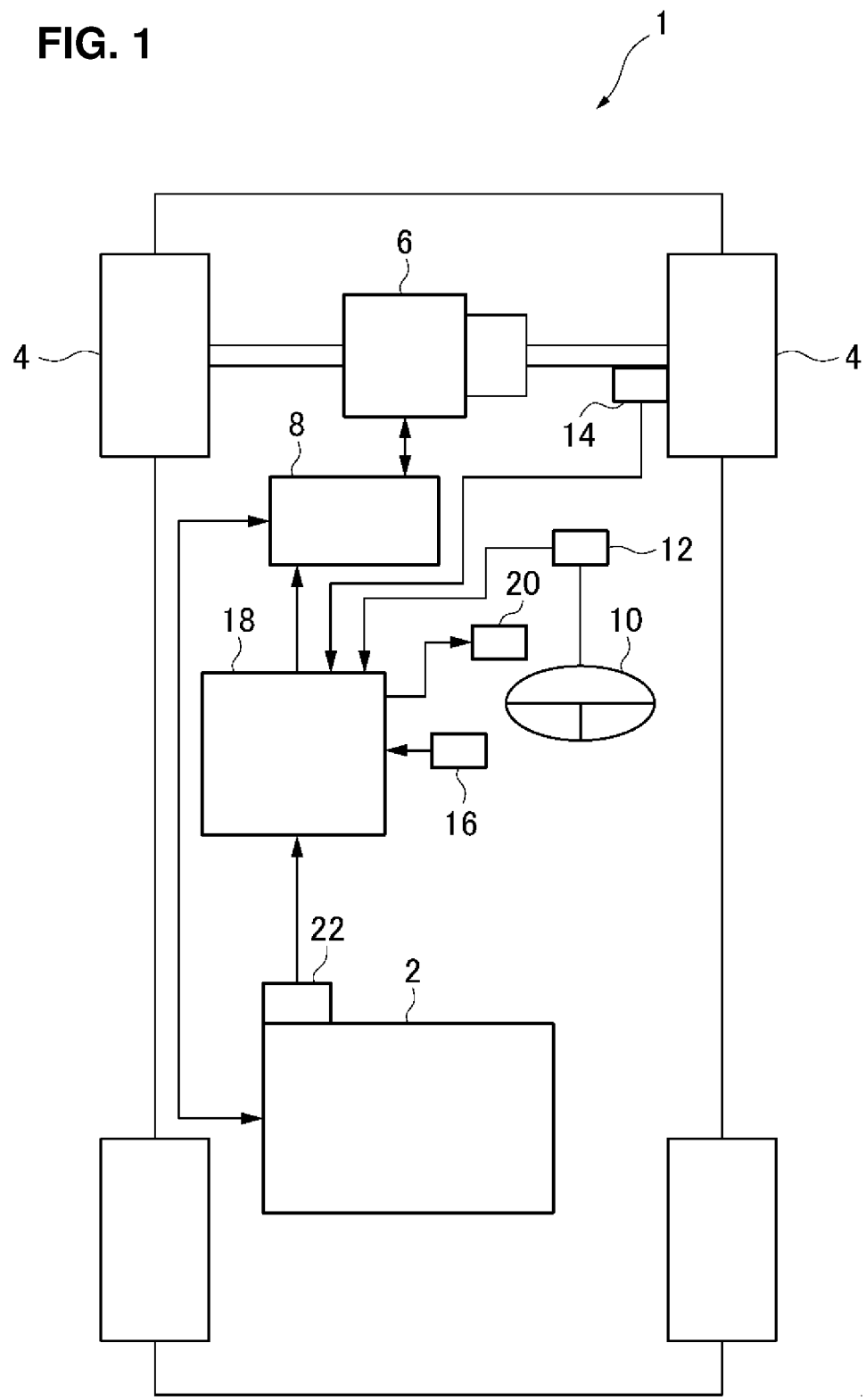
FIG. 1 is a block diagram showing entire constitution of a vehicle installing a movement control device for a vehicle according to an embodiment of the present invention.

Hereinafter, a movement control device for a vehicle according to an embodiment of the present invention will be described referring to the accompanying drawings. First, a vehicle installing the movement control device for a vehicle according to the embodiment of the present invention will be described referring to FIG. 1. FIG. 1 is a block diagram showing entire constitution of the vehicle installing the movement control device for a vehicle according to the embodiment of the present invention.

As shown in FIG. 1, the vehicle 1 installing the movement control device for a vehicle according to the present embodiment installs a battery 2 (chargeable battery) as a power source, and is an electric automotive vehicle or a hybrid automotive vehicle which is equipped with front wheels steered. A motor 6 to drive driving wheels 4 (right-and-left front wheels in an example of FIG. 1) is installed at a vehicle-body front portion of the vehicle 1. Further, an inverter 8 is arranged near the motor 6. The inverter 8 converts the direct-current electric power fed from the battery 2 to the alternating-current electric power and supplies to the motor 6, and also charges the battery 2 by converting regenerative electric power generated by the motor 6 to the direct-current electric power and supplying to the battery 2.

The vehicle 1 further comprises a steering angle sensor 12 to detect a rotational angle of a steering wheel 10, a vehicle speed sensor 14 to detect a vehicle speed, and a yaw rate sensor 16 to detect a yawing angle speed of the vehicle 1 rotating around a vertical axis (yaw axis). These sensors output respective detection values to a movement control device for a vehicle 18. Further, the vehicle 1 comprises an indicator 20 to indicate information relating to the movement control of the vehicle 1 by means of the movement control device for a vehicle 18. The battery 2 is equipped with a battery state detector 22 to detect SOC (State Of Charge) and a temperature of the battery 2.

Next, electric constitution of the movement control device for a vehicle 18 according to the embodiment of the present invention will be described referring to FIG. 2. FIG. 2 is a block diagram showing the electric constitution of the movement control device for a vehicle 18 according to the embodiment of the present invention. The movement control device for a vehicle 18 comprises a yaw-acceleration calculation portion 24 to calculate target acceleration of the vehicle 1, a turn-back steering determination portion 25 to determine whether turn-back steering of the vehicle 1 is conducted or not, and a drive-force control portion 26 to control a drive force of the vehicle 1. To this movement control device for a vehicle 18 are inputted the steering angle detected by the steering angle sensor 12, the vehicle speed detected by the vehicle speed sensor 14, the yaw rate detected by the yaw rate sensor 16, and the SOC and the temperature detected by the battery state detector 22.

The yaw-acceleration calculation portion 24 calculates, based on the steering angle inputted from the steering angle sensor 12 and the vehicle speed inputted from the vehicle speed sensor 14, a target yaw rate of the vehicle 1, and calculates target yaw acceleration of the vehicle 1 based on the target yaw rate. The turn-back steering determination portion 25 performs turn-back determination processing which will be specifically described later. The drive-force control portion 26 decides, based on the calculated target yaw acceleration, the determined turn-back steering state, and the state of the battery 2, a torque-control quantity (i.e., a drive-force decrease quantity or a drive-force increase quantity) of the motor 6, and controls the amount of the regenerative electric power generated by the motor 6 or the amount of the electric power supplied to the motor 6 so that the torque-control quantity of the motor 6 can be obtained. The drive-force control portion 26 outputs information regarding whether or not this drive-force control portion 26 is in a state capable of controlling a drive force of the motor 6. These yaw-acceleration calculation portion 24, the turn-back steering determination portion 25, and the drive-force control portion 26 are constituted by a computer which comprises CPU, various types of programs run on the CPU (including a basic control program, such as OS and application programs run on the OS to perform specific functions), internal memories to store programs and data, such as ROM and RAM.

Figure 4:
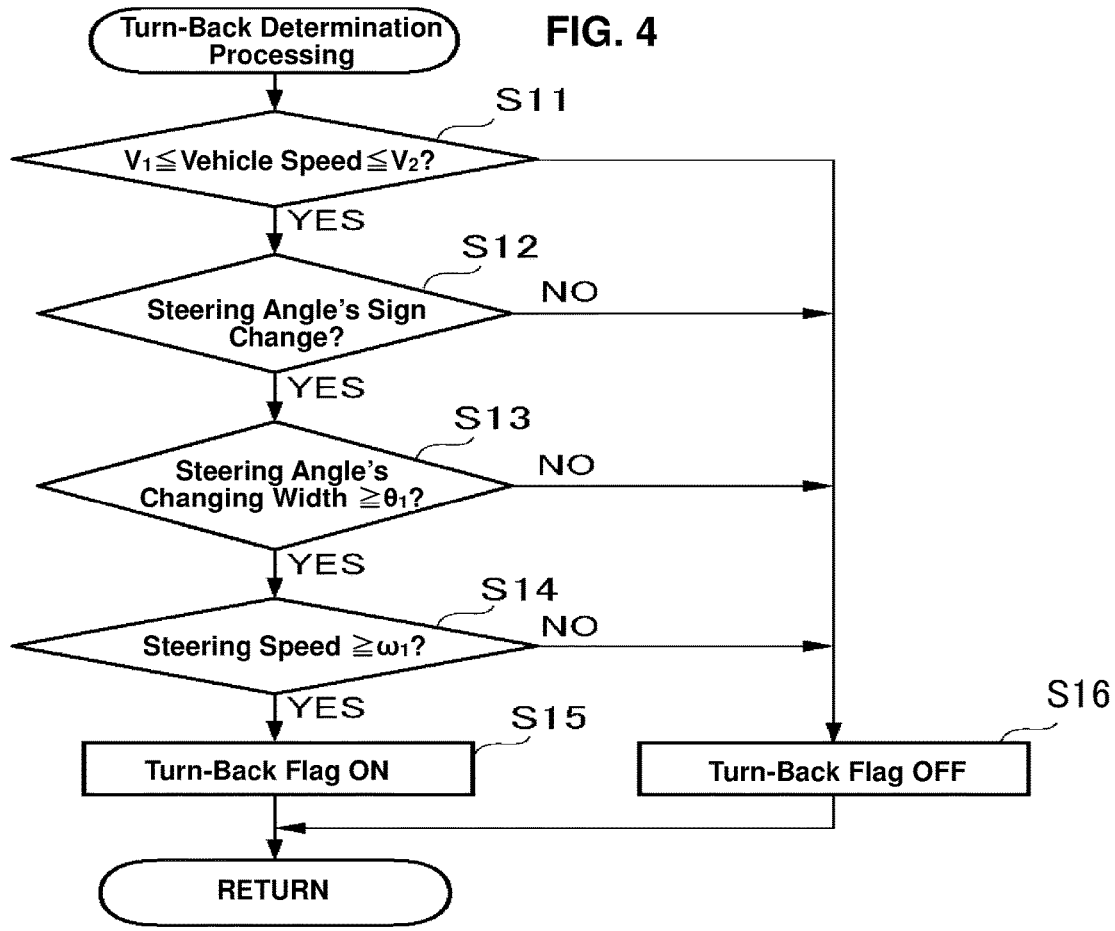
FIG. 4 is a flowchart of turn-back determination processing in the movement control processing shown in FIG. 3.
Figure 5:
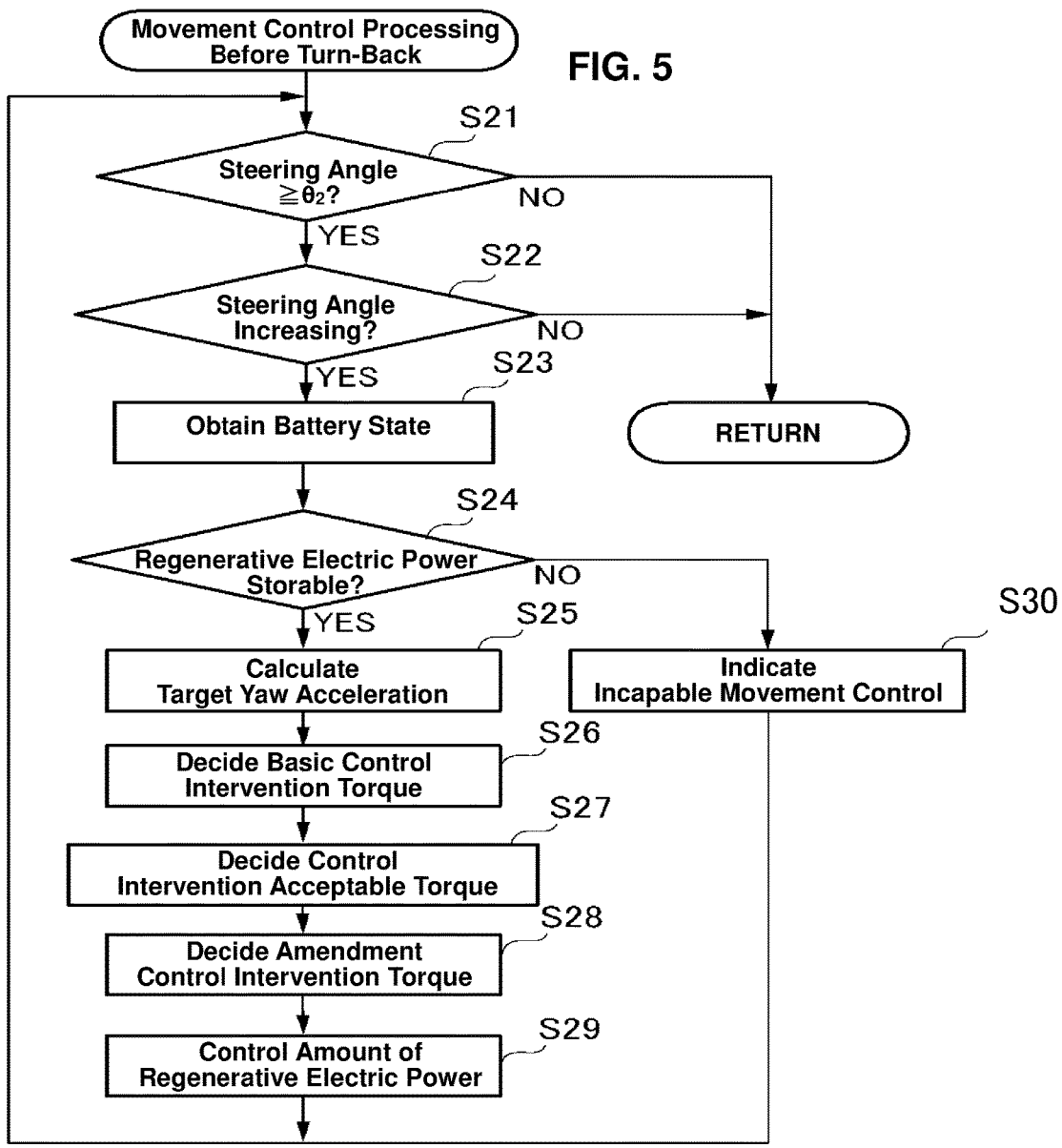
FIG. 5 is a flowchart of movement control processing before turn-back in the movement control processing shown in FIG. 3.
Figure 6:
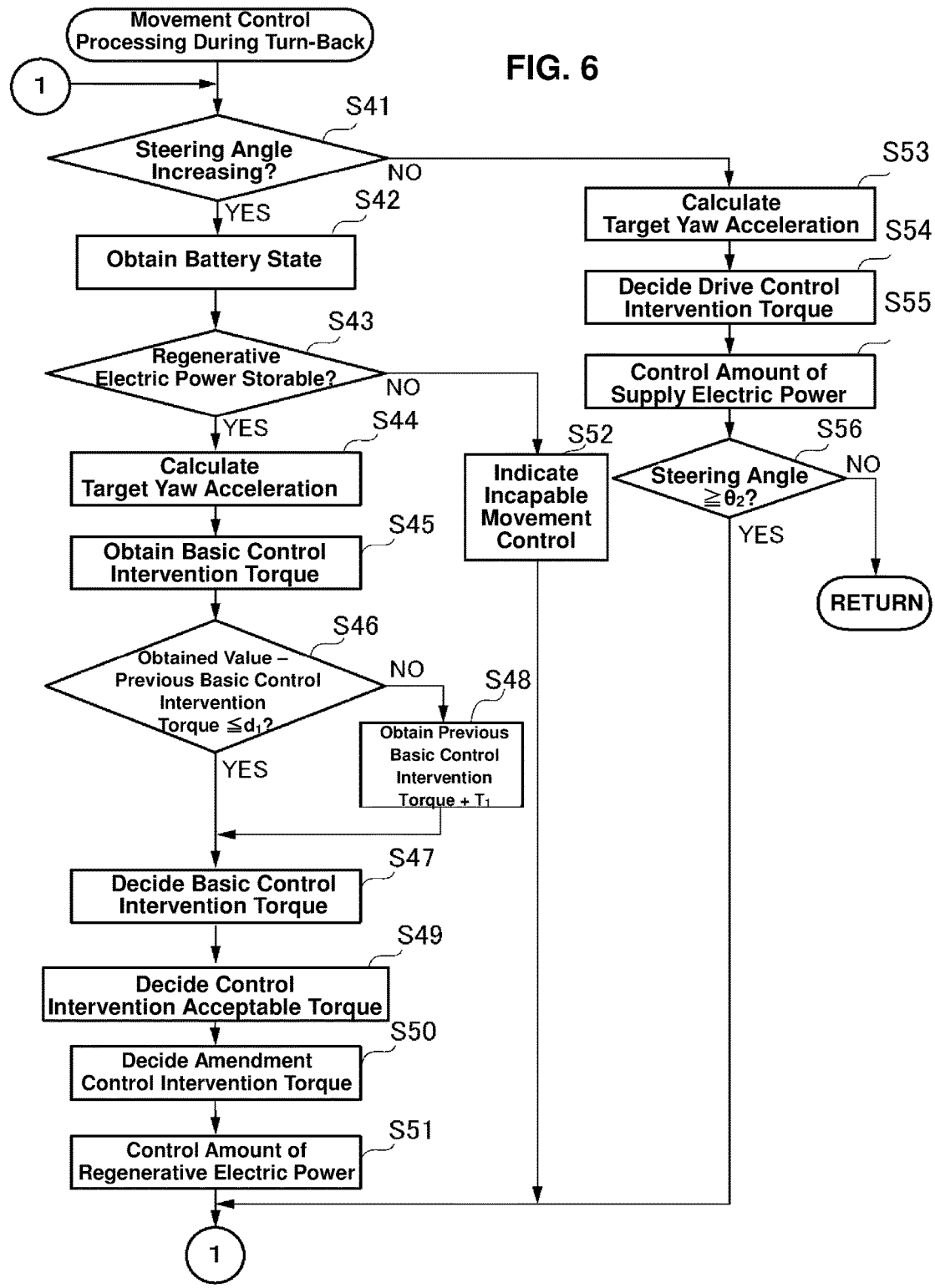
FIG. 6 is a flowchart of movement control processing during turn-back in the movement control processing shown in FIG. 3.
Figure 7:
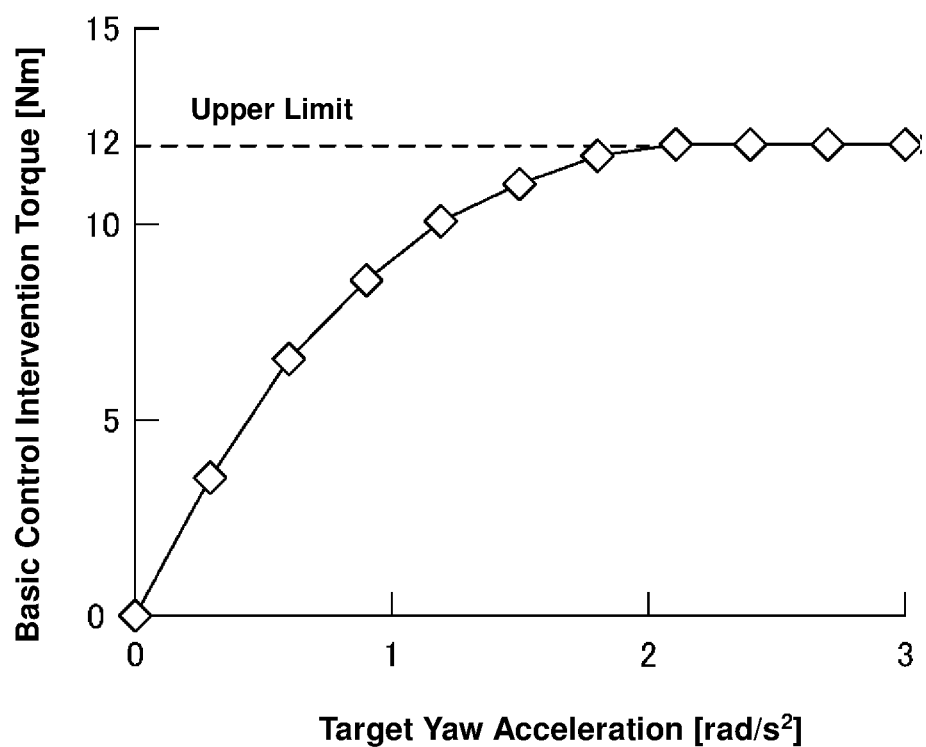
FIG. 7 is a map to be referred to when a drive-force control portion according to the embodiment of the present invention decides a basic control intervention torque based on target yaw-rate acceleration.

Next, processing performed by the movement control device for a vehicle 18 will be described referring to FIGS. 3 through 7. FIG. 3 is a flowchart of movement control processing to control the movement of the vehicle 1 by means of the movement control device for a vehicle 18 according to the embodiment of the present invention. FIG. 4 is a flowchart of turn-back determination processing in the movement control processing shown in FIG. 3. FIG. 5 is a flowchart of movement control processing before turn-back in the movement control processing shown in FIG. 3. FIG. 6 is a flowchart of movement control processing during turn-back in the movement control processing shown in FIG. 3. FIG. 7 is a map to be referred to when the drive-force control portion according to the embodiment of the present invention decides a basic control intervention torque based on the target yaw-rate acceleration.

First, the movement control processing will be described referring to FIG. 3. This movement control processing is activated when an ignition of the vehicle 1 is turned on and the power of the movement control device for a vehicle 18 is turned on, and repeatedly performed.

As shown in FIG. 3, when the movement control processing starts, the movement control device for a vehicle 18 obtains the steering angle detected by the steering angle sensor 12 in step S1.

Subsequently, the turn-back steering determination portion 25 of the movement control device for a vehicle 18 performs the turn-back determination processing as to whether the turn-back steering of the vehicle 1 is conducted or not in step S2. A state of a turn-back flag which shows whether the turn-back steering of the vehicle 1 is conducted or not is set at ON or OFF through the turn-back determination processing.

In the next step S3, the drive-force control portion 26 determines whether the state of the turn-back flag is OFF or not. When the state of the turn-back flag is OFF, that is—when the turn-back steering of the vehicle is not conducted, a processing sequence proceeds to step S4, where the drive-force control portion 26 performs movement control processing before turn-back which is the control for the case in which the turn-back steering is not conducted. Meanwhile, when it is determined in the step S3 that the state of the turn-back flag is not OFF (i.e., ON), that is—when the turn-back steering of the vehicle is conducted, the processing sequence proceeds to step S5, where the drive-force control portion 26 performs movement control processing during turn-back which is the control for the case in which the turn-back steering is conducted.

The movement control device for a vehicle 18 ends the movement control processing after the steps S4 or S5.

Next, the turn-back determination processing performed by the turn-back steering determination portion 25 in the step S3 will be described referring to FIG. 4.

As shown in FIG. 4, when the turn-back determination processing starts, the turn-back steering determination portion 25 determines whether or not the vehicle speed inputted from the vehicle speed sensor 14 is $V_1$ or greater and $V_2$ or smaller in step S11. Values of V1 and V2 are thresholds to define a speed range which may require the movement control of the vehicle 1 when the turn-back steering is conducted, and $V_1$=60 km/h and $V_2$=140 km/h, for example.

As a result, when the vehicle speed inputted from the vehicle speed sensor 14 is $V_1$ or greater and $V_2$ or smaller, the processing sequence proceeds to step S12, where the turn-back steering determination portion 25 determines whether or not a sign of the steering angle obtained in the step S1 executed in the current movement control processing changes from the one of the steering angle obtained in the step S1 executed in the previous movement control processing, that is—whether or not the steering is operated beyond its center position.

Consequently, when it is determined that the sign has changed, the processing sequence proceeds to step S13, where the turn-back steering determination portion 25 determines whether or not a changing width of the steering angle is $\theta_1$ or greater. Herein, the value of $\theta_1$ is a threshold to define the changing width of the steering angle which may require the movement control of the vehicle 1 when the turn-back steering is conducted, and $\theta_1$=40 deg, for example. The turn-back steering determination portion 25 determines whether or not the changing width of the steering angle during a specified period of time in the past is $\theta_1$ or greater, for example.

Herein, when it is determined that the changing width of the steering angle is $\theta_1$ or greater, the processing sequence proceeds to step S14, where the turn-back steering determination portion 25 determines whether or not the steering speed is $\omega_1$ or greater. Herein, the value of $\omega_1$ is a threshold to define a range of the steering speed which may require the movement control of the vehicle 1 when the turn-back steering is conducted, and $\omega_1$=30 deg/s, for example.

When it is determined that the steering speed is $\omega_1$ or greater, the processing sequence proceeds to step S15, where the turn-back steering determination portion 25 sets the turn-back flag at ON, considering that the turn-back steering of the vehicle 1 is conducted.

Meanwhile, when it is determined in the step S11 that the vehicle speed is smaller than $V_1$ or greater than $V_2$, it is determined in the step S12 that the sign of the steering angle has not changed, it is determined in the step S13 that the changing width of the steering angle is smaller than θ1, or it is determined in the step S14 that the steering speed is smaller than $\omega_1$, the processing sequence proceeds to step S16, where the turn-back steering determination portion 25 sets the turn-back flag at OFF, considering that the turn-back steering of the vehicle 1 is not conducted or that the movement control of the vehicle according to the turn-back steering may not be required.

After the steps S15, S16, the processing sequence returns to the movement control processing of FIG. 3.

Next, the movement control processing before turn-back performed in the step S4 of the movement control processing will be described referring to FIG. 5.

As shown in FIG. 5, when the movement control processing before turn-back starts, the drive-force control portion 26 determines in step S21 whether or not the steering angle obtained in the step S1 of the movement control processing of FIG. 3 is $\theta_2$ (5 deg, for example) or greater. When the steering angle is smaller than $\theta_2$, it is considered that the movement control of the vehicle 1 may not be required because the steering is not conducted, so that the processing sequence of the movement control device for a vehicle 18 returns to the movement control processing of FIG. 3.

Meanwhile, when the steering angle is $\theta_2$ or greater, the processing sequence proceeds to step S22, where the drive-force control portion 26 determines whether an absolute value of the steering angle obtained in the step S1 of the movement control processing of FIG. 3 is under increase or not. When it is determined that the absolute value of the steering angle is not under increase (i.e., constant or under decrease), it is considered that since the steering operation is held or under returning operation, not under turning operation, the movement control of the vehicle 1 may not be required, so that the processing sequence of the movement control device for a vehicle 18 returns to the movement control processing of FIG. 3.

Meanwhile, when the absolute value of the steering angle is under increase, the processing sequence proceeds to step S23, where the drive-force control portion 26 obtains the SOC and temperature detected by the battery state detector 22.

In the next step S24, the drive-force control portion 26 determines based on the state of the battery 2 obtained in the step S23 whether the battery 2 is capable of storing the regenerative electric power generated by the motor 6 or not. The drive-force control portion 26 determines that the battery 2 is capable of storing the regenerative electric power generated by the motor 6 when the SOC of the battery 2 is a specified value or smaller and the temperature of the battery 2 is a specified temperature or lower.

When it is determined that the battery 2 is capable of storing the regenerative electric power generated by the motor 6, the processing sequence proceeds to step S25, where the yaw-acceleration calculation portion 24 calculates the target yaw rate of the vehicle 1 based on the steering angle inputted from the steering angle sensor 12 and the vehicle speed inputted from the vehicle speed sensor 14, and then calculates the target yaw acceleration of the vehicle based on this target yaw rate. Specifically, the yaw-acceleration calculation portion 24 calculates the target yaw rate by multiplying the steering angle inputted from the steering angle sensor 12 by a coefficient according to the vehicle speed inputted from the vehicle speed sensor 14, and also calculates the target yaw acceleration by differentiating the target yaw rate by time.

In the next step S26, the drive-force control portion 26 decides the amount of torque decreasing (a basic control intervention torque) of the motor 6 based on the target yaw acceleration calculated by the yaw-acceleration calculation portion 24 in the step S25. This basic control intervention torque means the amount of torque decreasing for providing the vehicle 1 traveling at a corner (curve) with appropriate deceleration, and this basic control intervention torque is a basic value which is decided without considering the vehicle speed or the amount of regenerative electric power storable at battery 2. Specifically, the drive-force control portion 26 refers to a map showing a relationship of the target yaw acceleration and the basic control intervention torque, and specifies the basic control intervention torque which corresponds to the target yaw acceleration calculated by the yaw-acceleration calculation portion 24 in the step S 25. FIG. 7 is the map to be referred to when the drive-force control portion 26 according to the embodiment of the present invention decides the basic control intervention torque based on the target yaw-rate acceleration. In FIG. 7, the abscissa represents the target yaw acceleration and the ordinate represents the basic control intervention torque. As shown in FIG. 7, as the target yaw acceleration increases, the basic control intervention torque increases gradually, approaching to a specified upper limit (12 Nm in FIG. 7).

That is, the drive-force control portion 26 controls such that the basic control intervention torque is increased as the target yaw acceleration increases. Herein, the increasing rate of the basic control intervention torque becomes smaller as the target yaw acceleration increases.

In the next step S27, the drive-force control portion 26 decides a control intervention acceptable torque based on the state of the battery 2 obtained in the step S23. This control intervention acceptable torque means the amount of torque decreasing of the motor 6 which corresponds to the maximum amount of regenerative electric power which is storable at the battery 2. Specifically, the drive-force control portion 26 specifies, based on the SOC and the temperature of the battery 2, the amount of regenerative electric power from the motor 6 which is storable at the battery 6 and the maximum electricity which can be fed to the battery 2, and then calculates regenerative electric power allowable to the motor 6 based on the amount of regenerative electric power and the maximum electricity. Consequently, the drive-force control portion 26 calculates the regenerative torque which corresponds to this allowable regenerative electric power as the control intervention acceptable torque.

In the next step S28, the drive-force control portion 26 decides an amendment control intervention torque which is obtained by amending the basic control intervention torque decided by the drive-force control portion 26 in the step S26. Specifically, the drive-force control portion 26 specifies any smaller one of the basic control intervention torque decided in the step S26 and the control intervention acceptable torque decided in the step S27 as the amendment control intervention torque.

In the next step S29, the drive-force control portion 26 controls the amount of regenerative electric power generated by the motor 6 so that the amount of torque decreasing of the motor 60 becomes the amendment control intervention torque decided in the step S28. Specifically, the drive-force control portion 26 controls a regenerative circuit in the inverter 8 so that the motor 6 can generate the regenerative electric power which corresponds to the amendment control intervention torque decided in the step S28.

Further, when it is determined in the step S24 that the battery 2 is not capable of storing the regenerative electric power generated by the motor 6 (i.e., when the SOC of the battery 2 is greater than the specified value, or the temperature of the battery 2 is higher than the specified temperature), the processing sequence proceeds to step S30, where the drive-force control portion 26 makes the indicator 20 indicates information that the movement control device for a vehicle 18 is not capable of performing the decreasing control of the drive force of the vehicle 1.

After the steps S29, S30, the processing sequence of the drive-force control portion 26 returns to the step S21. After this, the drive-force control portion 26 repeats the processing from the step S21 to the step S30 until it is determined in the step S21 that the steering angle is smaller than the value $\theta_2$ or it is determined in the step S22 that the absolute value of the steering angle is constant or under decrease. When it is determined in the step S21 that the steering angle is smaller than the value $\theta_2$ or it is determined in the step S22 that the absolute value of the steering angle is constant or under decrease, the movement control device for a vehicle 18 returns to the movement control processing of FIG. 3.

Next, the movement control processing during turn-back performed in the step S5 of the movement control processing will be described referring to FIG. 6.

As shown in FIG. 6, when the movement control processing during turn-back starts, the drive-force control portion 26 determines in step S41 whether the absolute value of the steering angle obtained in the step S1 of the movement control processing of FIG. 3 is under increase or not. When it is determined that the absolute value of the steering angle is under increase, the processing sequence proceeds to step S42, where the drive-force control portion 26 obtains the SOC and the temperature detected by the battery state detector 22.

In the next step S43, the drive-force control portion 26 determines based on the state of the battery 2 obtained in the step S42 whether the battery 2 is capable of storing the regenerative electric power generated by the motor 6 or not. The drive-force control portion 26 determines that the battery 2 is capable of storing the regenerative electric power generated by the motor 6 when the SOC of the battery 2 is the specified value or smaller and the temperature of the battery 2 is the specified temperature or lower.

When it is determined that the battery 2 is capable of storing the regenerative electric power generated by the motor 6, the processing sequence proceeds to step S44, where the yaw-acceleration calculation portion 24 calculates a target yaw rate of the vehicle 1 based on the steering angle inputted from the steering angle sensor 12 and the vehicle speed inputted from the vehicle speed sensor 14, and then calculates the target yaw acceleration of the vehicle 1 based on this target yaw rate.

In the next step S45, the drive-force control portion 26 decides the basic control intervention torque of the motor 6 based on the target yaw acceleration calculated by the yaw-acceleration calculation portion 24 in the step S44. A method of obtaining this basic control intervention torque is the same as the method of specifying the basic control intervention torque in the step S26 of FIG. 5.

In the next step S46, the drive-force control portion 26 determines whether or not a value which is obtained by subtracting the basic control intervention torque previously determined in the previous movement control processing during turn-back from the basic control intervention torque currently obtained in the step S45 is $d_1$ (0.5 Nm, for example) or smaller. Herein, in a case in which the step S46 is executed for the first time in the movement control processing during turn-back, a value of this "basic control intervention torque previously determined in the previous movement control processing during turn-back" is set at zero (0).

When the value obtained by subtracting the basic control intervention torque previously determined in the previous movement control processing during turn-back from the basic control intervention torque currently obtained in the step S45 is $d_1$ or smaller, the pressing sequence proceeds to step S47, where the drive-force control portion 26 decides the basic control intervention torque obtained in the step S45 as the current basic control intervention torque.

Meanwhile, when the value obtained by subtracting the basic control intervention torque previously determined in the previous movement control processing during turn-back from the basic control intervention torque currently obtained in the step S45 is greater than $d_1$, the pressing sequence proceeds to step S48, where the drive-force control portion 26 obtains a value which is obtained by adding a specified value $T_1$ (1 Nm, for example) to the basic control intervention torque previously decided. In the next step S47, the drive-force control portion 26 decides the value obtained in the step S48 as a current basic control intervention torque.

After the step S47, the processing sequence proceeds to step S49, where the drive-force control portion 26 decides a control intervention acceptable torque based on the state of the battery 2 obtained in the step S42.

In the next step S50, the drive-force control portion 26 decides an amendment control intervention torque which is obtained by amending the basic control intervention torque which is decided by the drive-force control portion 26 in the step S47. Specifically, the drive-force control portion 26 specifies any smaller one of the basic control intervention torque decided in the step S47 and the control intervention acceptable torque decided in the step S48 as the amendment control intervention torque.

In the next step S51, the drive-force control portion 26 controls the amount of regenerative electric power generated by the motor 6 so that the amount of torque decreasing of the motor 60 becomes the amendment control intervention torque decided in the step S28.

Further, when it is determined in the step S43 that the battery 2 is not capable of storing the regenerative electric power generated by the motor 6, the processing sequence proceeds to step S52, where the drive-force control portion 26 makes the indicator 20 indicate information that the movement control device for a vehicle 18 is not capable of performing the decreasing control of the drive force of the vehicle 1.

After the steps S51, S52, the processing sequence of the drive-force control portion 26 returns to the step S41. After this, the drive-force control portion 26 repeats the processing from the step S41 to the step S52 until it is determined in the step S41 that the absolute value of the steering angle is constant or under decrease.

When it is determined in the step S41 that the absolute value of the steering angle is not under increase (constant or under decrease), the processing sequence proceeds to step S53, where the yaw-acceleration calculation portion 24 calculates the target yaw rate of the vehicle 1 based on the steering angle inputted from the steering angle sensor 12 and the vehicle speed inputted from the vehicle speed sensor 14, and then calculates the target yaw acceleration of the vehicle 1 based on this target yaw rate.

In the next step S54, the drive-force control portion 26 decides the amount of torque increasing (a drive control intervention torque) of the motor 6 based on the target yaw acceleration calculated by the yaw-acceleration calculation portion 24 in the step S53. This drive control intervention torque means the amount of torque increasing for providing the vehicle 1 with an appropriate acceleration when the turn-back steering is conducted and the absolute value of the steering angle decreases. For example, the drive-force control portion 26 decides the drive control intervention torque referring to the map shown in FIG. 4 in the same manner as the case of deciding the basic control intervention torque. That is, the drive-force control portion 26 controls such that the drive control intervention torque is increased as the target yaw acceleration increases. Herein, the increasing rate of the drive control intervention torque becomes smaller as the target yaw acceleration increases.

In the next step S55, the drive-force control portion 26 controls the amount of supply electric power to the motor 6 so that the amount of torque increasing of the motor 6 becomes the drive control intervention torque decided in the step S54. Specifically, the drive-force control portion 26 controls an electric-power supply circuit provided in the inverter 8 so that the electric power corresponding to the drive control intervention torque decided in the step S54 can be supplied to the motor 6. Thereby, the drive-force control portion 26 increases the drive force to its magnitude corresponding to the drive control intervention torque.

In the next step S56, the drive-force control portion 26 determines whether or not the steering angle obtained in the step S1 of the movement control processing of FIG. 3 is $\theta_2$ or greater. When it is determined that the steering angle is $\theta_2$ or greater, the processing sequence performed by the drive force control portion 26 returns to the step S41.

Meanwhile, when it is determined that the steering angle is smaller than $\theta_2$, the movement control device for a vehicle 18 returns to the movement control processing of FIG. 3, considering that the movement control of the vehicle 1 may not be required because no steering is conducted.

Next, the operation of the movement control device for a vehicle 18 according to the present invention will be explained referring to FIGS. 8A-8F, which are diagram showing time changes of parameters relating to the movement control by the movement control device for a vehicle 18 when the vehicle 1 installing the movement control device for a vehicle 18 according to the embodiment of the present invention conducts a lane change.

FIG. 8A is a plan view schematically showing the vehicle 1 conducting the lane change. As shown in FIG. 8A, the vehicle 1 turns to the right up to a position C from a position A by way of a position B, and then turns to the left up to a position E from the position C by way of a position D, resulting in conducting the lane change to the right-side lane.

FIG. 8B is the diagram showing a change of the steering angle of the vehicle 1 conducting the lane change as shown in FIG. 8A (the direction of the steering to the right is positive). In FIG. 8B, the abscissa represents the time and the ordinate represents the steering angle. As shown in FIG. 8B, the steering to the right starts at the position A, the steering angle of the steering to the right increases gradually through the turning operation of the steering, and becomes the maximum at the position B. After this, the steering angle of the steering to the right decreases gradually through the turning operation of the steering, and becomes zero (0) at the position C. Then, the turn-back steering to the left starts at the position C and the steering angle of the steering to the left becomes the maximum at the position D. After this, the steering angle of the steering to the left decreases gradually and becomes zero (0) again at the position E.

FIG. 8C is the diagram showing a change of the target yaw rate which is calculated based on the steering angle of the vehicle 1 shown in FIG. 8B. In FIG. 8B, the abscissa represents the time and the ordinate represents the target yaw rate (the clockwise direction (CW) is positive). As shown in FIG. 8C, the target yaw rate of the vehicle 1 changes proportionally to the change of the steering angle. That is, when the steering to the right starts at the position A, the clockwise (CW) target yaw rate is calculated. This clockwise target yaw rate becomes the maximum at the position B. After this, the clockwise target yaw rate decreases gradually and becomes zero (0) at the position C. Then, when the turn-back steering to the left starts at the position C, the counterclockwise (CCW) target yaw rate occurs at the vehicle 1. The counterclockwise target yaw rate becomes the maximum at the position D. After this, the counterclockwise target yaw rate decreases gradually, and becomes the zero (0) at the position E. Herein, since the returning operation of the steering is conducted from the position B to the position C, the drive force control portion 26 determines in the step S22 of the movement control processing before turn-back of FIG. 5 that the absolute value of the steering angle is not under increase, resulting in ending the movement control processing before turn-back. Accordingly, the drive force control portion 26 does not perform calculating of the target yaw rate from the position B to the position C.

FIG. 8D is the diagram showing a change of the target yaw acceleration which is calculated based on the target yaw rate shown in FIG. 8C. In FIG. 8D, the abscissa represents the time and the ordinate represents the target yaw acceleration (the clockwise direction (CW) is positive). The target yaw acceleration of the vehicle 1 is represented by differentiating the target yaw rate of the vehicle 1 by time. That is, as shown in FIG. 8D, the steering to the right starts at the position A, and when the clockwise target yaw rate is calculated, the clockwise (CW) target yaw acceleration is calculated. The clockwise target yaw acceleration becomes the maximum between the position A and the position B. After this, the clockwise target yaw acceleration decreases, and when the clockwise target yaw rate becomes the maximum at the position B, the target yaw acceleration becomes zero (0). Further, when the clockwise target yaw rate decreases from the position B to the position C, the counterclockwise (CCW) target yaw acceleration is calculated. This counterclockwise target yaw acceleration becomes the maximum. Then, the turn-back steering to the left starts at the position C, and the counterclockwise target yaw rate is calculated. Until the counterclockwise target yaw rate becomes the maximum at the position D, the counterclockwise target yaw acceleration decreases and becomes zero (0) at the position D. After this, when the counterclockwise yaw rate decreases from the position D to the position E, the clockwise target yaw acceleration is calculated. The clockwise target yaw acceleration becomes the maximum between the position D and the position E, and then becomes zero (0) at the position E. Herein, since the returning operation of the steering is conducted from the position B to the position C, the drive force control portion 26 determines in the step S22 of the movement control processing before turn-back of FIG. 5 that the absolute value of the steering angle is not under increase, resulting in ending the movement control processing before turn-back. Accordingly, the drive force control portion 26 does not perform calculating of the target yaw rate from the position B to the position C.

FIG. 8E is the diagram showing a change of the torque-control quantity of the motor 6 which is determined by the drive-force control portion 26 based on the target yaw acceleration shown in FIG. 8D. In FIG. 8E, the abscissa represents the time and the ordinate represents the torque-control quantity (the torque increase is positive). FIG. 8E shows a case in which the amendment control intervention torque decided by the drive-force control portion 26 in the step S28 of the movement control processing before turn-back of FIG. 5 is the basic control intervention torque decided in the step S26 (i.e., a case in which the basic control intervention torque is smaller than the control intervention receptacle torque).

As described above, the drive force control portion 26 performs its control such that when the turn-back steering is not conducted, the basic control intervention torque is increased as the target yaw acceleration increases. Herein, the increasing rate of the basic control intervention torque through the control of the force control portion 26 becomes smaller as the target yaw acceleration increases. Accordingly, as shown in FIG. 8E, when the clockwise yaw acceleration is calculated between the position A and the position B, the amount of torque decreasing increases as the target yaw acceleration increases. When the clockwise target yaw acceleration becomes the maximum between the position A and the position B, the amount of torque decreasing becomes the maximum, too. After this, the amount of torque decreasing decreases as the clockwise target yaw acceleration decreases. When the target yaw acceleration becomes zero (0) at the position B, the amount of torque decreasing becomes zero (0), too. Since the turn-back operation of the steering is conducted from the position B to the position C, the drive-force control portion 26 determines in the step S22 of the movement control processing before turn-back of FIG. 5 that the absolute value of the steering angle is not under increase, and ends the movement control processing before turn-back. Accordingly, the drive-force control portion 26 does not perform the torque decreasing (i.e., the amount of torque decreasing=0).

Then, when the turn-back steering to the left starts at the position C, the basic control intervention torque shown by a one-dotted broken line in FIG. 8E is obtained in the step S45 of the movement control processing during turn-back of FIG. 6. In this case, the amount of torque decreasing increases with a constant rate up to the basic control intervention torque obtained in the step S45 of the movement control processing during turn-back of FIG. 6. After this, the basic control intervention torque is used as the amount of torque decreasing. Subsequently, the amount of torque decreasing decreases as the counterclockwise target yaw acceleration decreases from the position C to the position D. Finally, when the target yaw acceleration becomes zero (0) at the position D, the amount of torque decreasing becomes zero (0), too.

Further, when the angle of the steering to the left decreases because of the start of the returning operation of the steering in the turn-back steering at the position D, the drive-force control portion 26 increases the drive control intervention torque of the vehicle 1 according to the target yaw acceleration. That is, as shown in FIG. 8E, when the clockwise target yaw acceleration is calculated between the position D and the position E, the amount of torque increasing increases as the target yaw acceleration increases. When the clockwise target yaw acceleration becomes the maximum between the position D and the position E, the amount of torque increasing becomes the maximum. Then, the amount of torque increasing decreases as the clockwise target yaw acceleration decreases, and finally when the target yaw acceleration becomes zero (0) at the position E, the amount of torque increasing becomes zero (0), too.

FIG. 8F is the diagram showing a change of a yaw rate (an actual yaw rate) which occurs at the vehicle 1 conducting its steering as shown in FIG. 8B when the torque control of the motor 6 is performed as shown in FIG. 8E. In FIG. 8F, the abscissa represents the time and the ordinate represents the yaw rate (the clockwise (CW) yaw rate is positive). A solid line of FIG. 8F shows the change of the actual yaw rate when the torque control of the motor 6 is not performed, and a broken line of FIG. 8F shows the change of the actual yaw rate when the torque control of the motor 6 is not performed between the position D and the position E.

When the steering to the right starts at the position A and the amount of torque increasing increases as shown in the FIG. 8E as the clockwise target yaw acceleration increases, the load acting on the front wheels as the steering wheels of the vehicle 1 increases. Consequently, the friction between the front wheels and the road surface increases, and thereby the cornering force of the front wheels increases, so that the turning performance of the vehicle 1 improves. Further, when the steering to the left starts at the position C and the amount of torque decreasing increases as shown in the FIG. 8E according to the counterclockwise target yaw acceleration, the load acting on the front wheels as the steering wheels of the vehicle 1 increases, so that the cornering force of the front wheels increases and thereby the turning performance of the vehicle 1 improves. Moreover, when the returning operation of the steering in the turn-back steering starts at the position D and the amount of torque increasing increases as shown in the FIG. 8E as the clockwise target yaw acceleration increases, the load which acts on the rear wheels of the vehicle 1 increases. Consequently, the cornering force of the rear wheels increases, so that the straight advancing ability of the vehicle 1 improves. Accordingly, compared with a case in which the torque control of the motor 6 is not performed between the position D and the position E, the actual yaw rate converges more quickly.

Next, some modifications of the embodiment of the present invention will be described. While it is explained in the above-described embodiment that the vehicle 1 installing the movement control device for a vehicle 18 installs the battery 2 as the power source, the movement control device for a vehicle 18 may be installed at the vehicle 1 installing a gasoline engine or a diesel engine as the power source. In this case, the drive-force control portion 26 reduces the drive force of the gasoline engine or the diesel engine by controlling the amount of fuel injection or a transmission according to the yaw acceleration.

Further, while it is explained in the above-described embodiment that the drive-force control portion 26 decides the torque-control quantity of the motor 6 based on the target yaw acceleration calculated by the yaw acceleration calculation portion 24, the yaw acceleration calculation portion 24 may decide the torque-control quantity of the motor 6 based on other parameters relating to the yaw rate of the vehicle 1. For example, the yaw acceleration calculation portion 24 may calculate the yaw acceleration occurring at the vehicle 1 based on the yaw rate inputted from the yaw rate sensor 16, and the drive-force control portion 26 may decide the torque-control quantity of the motor 6 based on this calculated yaw acceleration. In this case, the drive-force control portion 26 controls such that the amount of torque decreasing or the amount of torque increasing of the motor 6 of the vehicle 1 is increased as the yaw acceleration occurring at the vehicle 1 increases. Herein, the increasing rate of the amount of torque decreasing or the amount of torque increasing becomes smaller as the yaw acceleration increases. Or, an acceleration sensor installed at the vehicle 1 may detect a lateral acceleration occurring at the vehicle 1 during the cornering, and the drive-force control portion 26 may decide the torque-control quantity of the motor 6 based on this lateral acceleration. In this case, the drive-force control portion 26 controls such that the amount of torque decreasing or the amount of torque increasing of the motor 6 of the vehicle 1 is increased as the lateral acceleration occurring at the vehicle 1 increases. Herein, the increasing rate of the amount of torque decreasing or the amount of torque increasing becomes smaller as the lateral acceleration increases.

Hereafter, the effects of the movement control device for a vehicle 18 according to the above-described embodiment of the present invention and the above-described modifications of the embodiment of the present invention will be described.

First, since the drive-force control portion 26 of the movement control device for a vehicle 18 increases the amount of torque decreasing quickly as the target yaw acceleration of the vehicle 1 increases after starting the steering of the vehicle 1 in a state in which the turn-back steering is not conducted (in an initial stage of the lane change before the turn-back steering, for example), the vehicle 1 can have the deceleration quickly at the start timing of steering of the vehicle 1, so that the sufficient load can be made to quickly act on the front wheels as the steered wheels. Consequently, the friction between the front wheels as the steered wheels and the road surface increases and thereby the cornering force of the front wheels increases, so that the turning performance of the vehicle 1 at the initial timing of the vehicle's cornering can be improved and thereby the responsiveness to the turning operation of the steering can be improved. Further, since the drive-force control portion 26 controls such that the increasing rate of the amount of the torque decreasing of the vehicle 1 becomes smaller according to the increase of the target yaw acceleration, it can be prevented that the deceleration of the vehicle 1 during the vehicle's cornering becomes excessive (too large), so that the deceleration can be decreased quickly when the steering is finished. Accordingly, the driver can be prevented from having improper dragging feelings of decreasing of the drive force when the vehicle gets out of the cornering. Additionally, since the drive-force control portion 26 increases the drive force in a state in which the turn-back steering is conducted and the absolute value of the steering angle of the vehicle 1 decreases (when the driver returns the steering wheel to its central position in a late stage of lane changing, for example), the vehicle 1 can have the acceleration at the steering for returning to the vehicle's turning ahead, so that the load acting on the rear wheels can be increased. Consequently, the cornering force of the rear wheels increases, so that the straight advancing ability of the vehicle 1 can be improved and thereby the yaw rate of the 1 can be surely made to converge. Thus, the movement control device for a vehicle 18 can prevent the delay of the yaw rate's convergence of the vehicle 1 even when the turn-back steering is conducted, thereby controlling the vehicle's movement properly so that the driver's operation during the vehicle's cornering can be natural and stable.

Further, the drive-force control portion 26 performs the torque decreasing control of the motor 6 of the vehicle 1 in the case in which the absolute value of the steering angle of the vehicle 1 increases. That is, since the drive force of the vehicle 1 is decreased in the case in which the absolute value of the steering angle of the vehicle 1 increases because of the turning operation of the steering, the sufficient load can be made to quickly act on the front wheels as the steered wheels when the turning operation of the steering is conducted, so that the responsiveness of the vehicle 1 to the turning operation of the steering can be improved surely.

In particular, the vehicle 1 is the electric-drive vehicle equipped with the motor 6 to drive wheels and the battery 2 to supply the electric power to the motor 6 and store the regenerative electric power generated by the motor 6, and the drive-force control portion 26 decreases the drive force of the vehicle 1 by controlling the amount of the regenerative electric power generated by the motor 6. That is, the drive-force control portion 26 can decrease the drive force of the vehicle 1 directly by decreasing the torque of the motor 6. Accordingly, compared with a case in which the drive force of the vehicle 1 is decreased by controlling an oil-pressure brake unit, the responsiveness of the drive-force decreasing can be improved, so that the movement of the vehicle 1 can be controlled more directly.

Moreover, when it is determined based on the state of the battery 2 is incapable of storing the regenerative electric power generated by the motor 6, the drive-force control 26 does not decrease the drive force of the vehicle 1 and makes the indicator 20 indicate the information that the drive force of the vehicle 1 is not decreased. That is, since the drive-force control 26 does not decrease the torque of the motor 6 so that the regenerative electric power is not generated in a case in which the battery 2 is overcharged because of the storing of the regenerative electric power generated by the motor 6 or a case in which the temperature of the battery 2 exceeds an allowable temperature range, the battery 2 can be prevented from having any damage. Further, since the drive-force control 26 makes the indicator 20 indicate the information that the drive force of the vehicle 1 is not decreased, the driver can be prevented from having uncomfortable feelings because the drive force is not decreased when the vehicle gets into the cornering.

What is claimed is:

1. A movement control device for a vehicle which controls a movement of the vehicle equipped with front wheels steered, the movement control device being configured to perform the process of:
    obtaining a yaw-rate relating quantity which relates to a yaw rate of the vehicle;
    determining whether a turn-back steering of the vehicle is conducted or not, the turn-back steering of the vehicle meaning a state where the front wheels are steered to either one side of the right and the left and subsequently steered to the other side of the right and the left; and
    controlling a drive force to be transmitted to at least one of right-and-left driving wheels of the vehicle such that the drive force transmitted to the at least one of the driving wheels is decreased according to the yaw-rate relating quantity,
    wherein said controlling of the drive force of the vehicle is configured such that when it is determined that the turn-back steering is conducted, the drive force transmitted to the at least one of the driving wheels is increased in a case in which an absolute value of a steering angle of the vehicle decreases.

2. The movement control device for the vehicle of claim 1, wherein said decreasing control of the drive force transmitted to the at least one of the driving wheels of the vehicle is performed in a case in which the absolute value of the steering angle of the front wheels of the vehicle increases.

3. The movement control device for the vehicle of claim 1, wherein the vehicle is an electric-drive vehicle equipped with a motor to drive the at least one of the right-and-left driving wheels and a battery to supply electric power to the motor and store regenerative electric power generated by the motor, and said decreasing control of the drive force transmitted to the at least one of the driving wheels of the vehicle is performed by controlling the amount of the regenerative electric power generated by the motor.

4. The movement control device for the vehicle of claim 2, wherein the vehicle is an electric-drive vehicle equipped with a motor to drive the at least one of the right-and-left driving wheels and a battery to supply electric power to the motor and store regenerative electric power generated by the motor, and said decreasing control of the drive force transmitted to the at least one of the driving wheels of the vehicle is performed by controlling the amount of the regenerative electric power generated by the motor.

5. The movement control device for the vehicle of claim 3, wherein the vehicle is further equipped with a battery-state detector to detect a state of the battery and an indicator to indicate information relating to the drive force's control, and said controlling of the drive force transmitted to the at least one of the driving wheels of the vehicle further includes a control of not decreasing the drive force of the vehicle and making said indicator indicate the information that the drive force transmitted to the at least one of the driving wheels of the vehicle is not decreased when it is determined based on the battery state detected by said battery-state detector that said battery is incapable of storing the regenerative electric power generated by the motor.

6. The movement control device for the vehicle of claim 4, wherein the vehicle is further equipped with a battery-state detector to detect a state of the battery and an indicator to indicate information relating to the drive force's control, and said controlling of the drive force of the vehicle further includes a control of not decreasing the drive force transmitted to the at least one of the driving wheels of the vehicle and making said indicator indicate the information that the drive force transmitted to the at least one of the driving wheels of the vehicle is not decreased when it is determined based on the battery state detected by said battery-state detector that said battery is incapable of storing the regenerative electric power generated by the motor.

7. The movement control device for the vehicle of claim 1, wherein said at least one of the right-and-left driving wheels is at least one of the front wheels of the vehicle.

8. The movement control device for the vehicle of claim 1, wherein said controlling of the drive force of the vehicle is configured such that when it is determined that the turn-back steering is not conducted yet after the front wheels are steered to the right or the left, the amount of said drive-force decreasing is increased with a specified increasing rate as the yaw-rate relating quantity increases, the specified increasing rate being configured to become smaller as the yaw-rate relating quantity increases.

* * * * *